(12) United States Patent
Ruohio et al.

(10) Patent No.: US 7,252,007 B2
(45) Date of Patent: Aug. 7, 2007

(54) METHOD FOR THE MANUFACTURING OF A CAPACITIVE PRESSURE SENSOR, AND A CAPACITIVE PRESSURE SENSOR

(75) Inventors: Jaakko Ruohio, Helsinki (FI); Riikka Åström, Vantaa (FI)

(73) Assignee: VTI Technologies Oy, Vantaa (FI)

( * ) Notice: Subject to any disclaimer, the term of this patent is extended or adjusted under 35 U.S.C. 154(b) by 282 days.

(21) Appl. No.: 11/114,215

(22) Filed: Apr. 26, 2005

(65) Prior Publication Data

US 2005/0248905 A1    Nov. 10, 2005

(30) Foreign Application Priority Data

May 3, 2004    (FI)    ................................... 20040629

(51) Int. Cl.
*G01L 9/00*    (2006.01)
(52) U.S. Cl. ............................ 73/718; 73/724; 29/592; 29/25.01; 29/25.02
(58) Field of Classification Search ................. 73/718, 73/724; 29/592, 25.01, 25.02
See application file for complete search history.

(56) References Cited

U.S. PATENT DOCUMENTS

| | | | | |
|---|---|---|---|---|
| 3,986,200 A | | 10/1976 | Allison | |
| 4,314,225 A | * | 2/1982 | Tominaga et al. | 338/4 |
| 5,444,286 A | * | 8/1995 | Ichihashi | 257/420 |
| 6,089,099 A | | 7/2000 | Sathe et al. | |
| 6,156,585 A | * | 12/2000 | Gogoi et al. | 438/48 |
| 6,860,154 B2 | * | 3/2005 | Yamamoto et al. | 73/718 |
| 2002/0092356 A1 | * | 7/2002 | Yamamoto et al. | 73/754 |
| 2005/0229711 A1 | * | 10/2005 | Ohms et al. | 73/718 |

FOREIGN PATENT DOCUMENTS

| | | |
|---|---|---|
| DE | 3445775 A1 | 7/1985 |
| DE | 272 737 A1 | 10/1989 |
| JP | 01255279 | 10/1989 |
| JP | 01261872 | 10/1989 |
| JP | 11135806 | 5/1999 |

* cited by examiner

*Primary Examiner*—Andre J. Allen
(74) *Attorney, Agent, or Firm*—Squire, Sanders & Dempsey L.L.P.

(57) ABSTRACT

The invention relates to measuring devices for the measuring of pressure, and more specifically to capacitive pressure sensors. The silicon crystal planes {111} are located at the corners of a wet etched membrane well of a pressure sensor element according to the present invention. An object of the invention is to provide an improved method of manufacturing a capacitive pressure sensor, and a capacitive pressure sensor suitable for use, in particular, in small capacitive pressure sensor solutions.

12 Claims, 4 Drawing Sheets

METHOD FOR THE MANUFACTURING OF A CAPACITIVE PRESSURE SENSOR, AND A CAPACITIVE PRESSURE SENSOR

FIELD OF THE INVENTION

The invention relates to measuring devices used in the measuring of pressure, and more specifically to capacitive pressure sensors. The object of the invention is to provide an improved method for the manufacturing of a capacitive pressure sensor and a capacitive pressure sensor suitable, in particular, for use in small capacitive pressure sensor solutions.

BACKGROUND OF THE INVENTION

The principle of measuring based on a capacitive pressure sensor has proved to be a simple and reliable way of measuring pressure. Capacitance measuring is based on a change in the gap between two surfaces of a pair of electrodes in the sensor. The capacitance between the surfaces, i.e. the storage capacity of electric charge, is a function of the area of the surfaces and the distance between the surfaces. Capacitance measuring can be used even at fairly low ranges of pressure.

The basis for the structure of small capacitive pressure sensors is a thin-film structure manufactured on silicon. The thin membrane forming one of the electrodes bends under influence of pressure and thus changes the capacitance to be measured.

Anisotropic wet etching of silicon is an inexpensive and relatively precise way of manufacturing thin-film structures in silicon. Its biggest drawback is the area occupied by structures defined by the extremely slowly etching sloping crystal planes {111}.

In anisotropic etching, the speed of the etching depends on the orientation of the crystal. Extremely slowly etching crystal planes are so called etching inhibitor planes, and they define the generated structure. On the other hand, the geometry of the structures is limited by the crystal structure and there are a limited number of basic structures. An aqueous solution of potassium hydroxide, KOH, for example, can be used as an anisotropic etching agent for silicon.

In silicon, the etching inhibitor planes are the crystal planes {111}. Silicon material is etched away by the etching agent, until it meets a crystal plane {111}. Should it be desired to end the etching at these planes, the structures have to be planned such, that they do not contain jutting corners, since the corner is going to be etched underneath. The etching will be stopped only at inward corners.

Prior art will be described below with exemplifying reference to the attached drawings, in which:

FIG. 1 shows the progress, as a function of time, of wet etching according to prior art, using two different etching masks, FIG. 2 shows the membrane structure of an ideal pressure sensor according to prior art, FIG. 3 shows the membrane structure of a pressure sensor obtained by anisotropic wet etching according to prior art, and FIG. 4 shows a silicon wafer of type (100) according to prior art, in which wafer membrane structures of a pressure sensor have been manufactured by anisotropic wet etching.

FIG. 1 shows the progress, as a function of time, of wet etching according to prior art, using two different etching masks. The figure shows, as initial conditions, a structure made on a silicon wafer of type (100) using a square etching mask 1, as well as a structure made on a silicon wafer of type (100) using a diamond shaped etching mask 2. In the figure, time progresses from left to right. Using a square etching mask, oriented in the direction <110>, the etching progresses evenly with no intruding etching 3, 4. Correspondingly, when using diamond shaped etching masks, oriented in the direction <010>, etching proceeds underneath the mask 5, 6.

In FIG. 1, etching is stopped before the shapes corrode into inverted pyramids. Identical structures 7, 8 are obtained as the end result of the etching. At the bottom of the figure, there is a sectional view of the generated structures. The final shape of the pattern is defined by the crystal planes {111}. The planes {111} form an angle arctan($1/\sqrt{2}$)=54.74° with the crystal plane (100) 9. The figure clearly shows the way in which the sloping planes decrease the area remaining in the center.

FIG. 2 shows an ideal pressure sensor membrane structure according to prior art. However, the ideal structure 10 depicted in the figure cannot be produced by wet etching into silicon (100).

FIG. 3 shows a pressure sensor membrane structure obtained by anisotropic wet etching according to prior art. In the structure 11 obtained through anisotropic wet etching depicted in the figure, the sloping surfaces consume $\sqrt{2}d$ of the length of the side, where d is the depth of the etching.

The most severe drawback of anisotropic wet etching is the surface area occupied by structures defined by the sloping extremely slowly etching crystal planes {111}. Often the problem of surface area loss is solved by using dry etching DRIE (Deep Reactive Ion Etching), but the evenness of the depth of the etching is not nearly so well controlled as in wet etching. Dry etching can further be performed just one wafer at a time, whereas wet etching can be performed on a batch of wafers at a time. In wet etching, the membrane structure of a pressure sensor is often given its finish by patterning the surface area of the flexible membrane portion on the back surface of the silicon structure.

FIG. 4 shows a silicon wafer of type (100) according to prior art, in which wafer pressure sensor membrane structures have been produced by anisotropic wet etching. Sixteen square etched surface areas 13 are depicted on the silicon wafer 12 according to prior art. In the figure, the area 14 of the flexible membrane portion, which is patterned on the back side of the membrane, is indicated by a circle. The cutting lines of the pressure sensors are drawn in heavy black lines.

In the structure of a pressure sensor according to prior art, a problem is the surface area occupied by the structures of the, in anisotropic wet etching of silicon, extremely slowly etching sloping crystal planes {111}. The sloping planes also diminish the area of the membrane portion remaining in the center of the pressure sensor.

SUMMARY OF THE INVENTION

The object of the invention is an improved method of manufacturing a capacitive pressure sensor, and an improved capacitive pressure sensor. By means of the present invention, silicon wafer surface area is saved and it is suitable, in particular, for use in small capacitive pressure sensor solutions.

According to a first feature of the present invention, a method for the manufacturing of a capacitive pressure sensor out of a silicon wafer element is provided, in which method a silicon wafer is masked for wet etching, etching of the silicon wafer is performed,
the etching mask is removed from the silicon wafer,
the silicon wafer is attached to a support structure,
the silicon wafer is cut into separate pressure sensor elements, such that the etching mask is fixed on top of the pressure sensor structures of the (100)-oriented silicon wafer to be anisotropically wet etched, which structures are essentially diamond shaped in relation to the direction <110>, such that the etching mask comprises slots, the ends of which are positioned at the corners of the pressure sensor structures to be etched.

Preferably, the etching mask may comprise slots oriented in the direction <110>. Preferably, the etching mask may comprise structures delaying etching underneath the mask. Preferably, the pressure sensitive membrane areas are shaped on the opposite side of the etched wafer or in the support structure facing the membrane.

Preferably, the shape of the membrane areas shaped on the opposite side of the etched wafer is given essentially rounded corners. Preferably, the shape of the membrane areas shaped on the opposite side of the etched wafer is given essentially rounded corners and the membrane is supported at its center.

Preferably the membrane areas are shaped by removing material by, for example, etching or oxidizing. Preferably, an anisotropic alkali is used for an etching solution, for example a solution of potassium hydroxide (KOH), a solution of ethylene diamine pyrocathechin (EDP), a solution of sodium hydroxide (NaOH) or a solution of tetramethylammonium hydroxide (TMAH).

According to a second feature of the present invention, a capacitive pressure sensor is provided, such that the crystal planes {111} of the silicon are located in the corners of the wet etched membrane well of the pressure sensor element.

Preferably, pressure sensitive membrane areas are shaped on the opposite side of the etched wafer or in the support structure facing the membrane. Preferably, the shape of the membrane areas shaped on the opposite side of the etched wafer has essentially rounded corners. Preferably, the membrane is supported at its center.

BRIEF DESCRIPTION OF THE DRAWINGS

The present invention and its preferred embodiments are described below in detail, with exemplifying reference to the attached figures, in which.

The FIGS. 1-4 are presented above.

The invention and the preferred embodiments thereof are described with reference to the FIGS. 5 to 7.

DETAILED DESCRIPTION OF THE INVENTION

Figure 1:
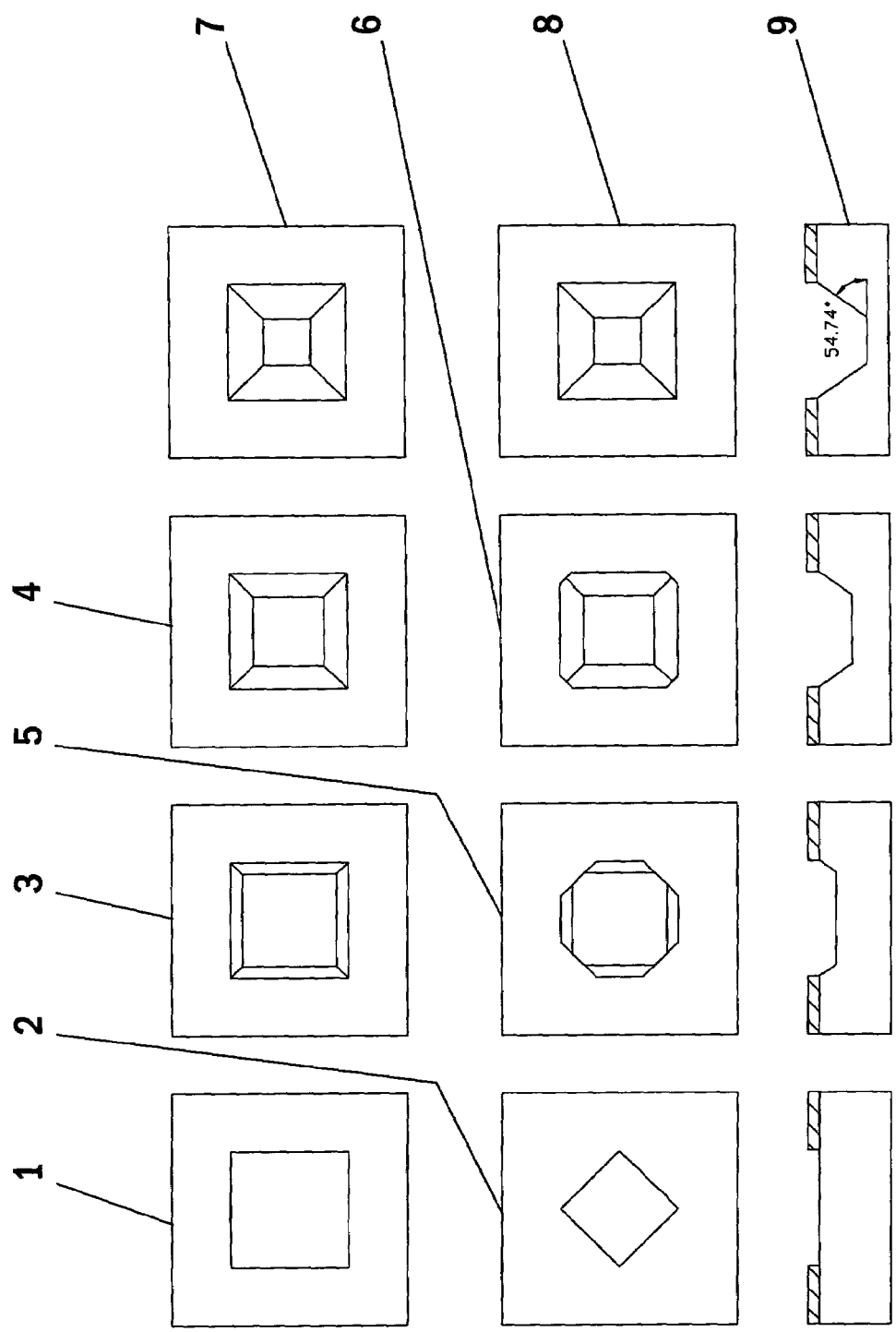
FIG. 1 shows the progress with time of wet etching according to prior art, using two different etching masks.
Figure 2:
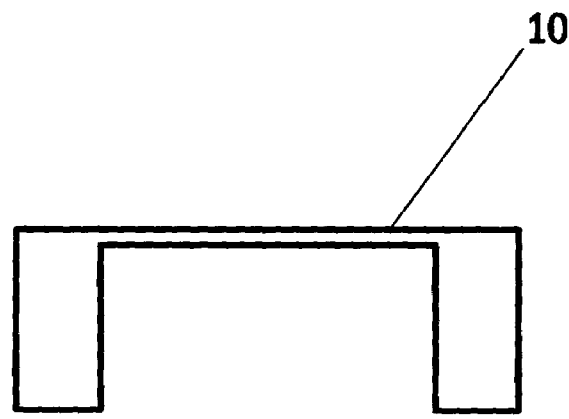
FIG. 2 shows an ideal membrane structure of a pressure sensor.
Figure 3:
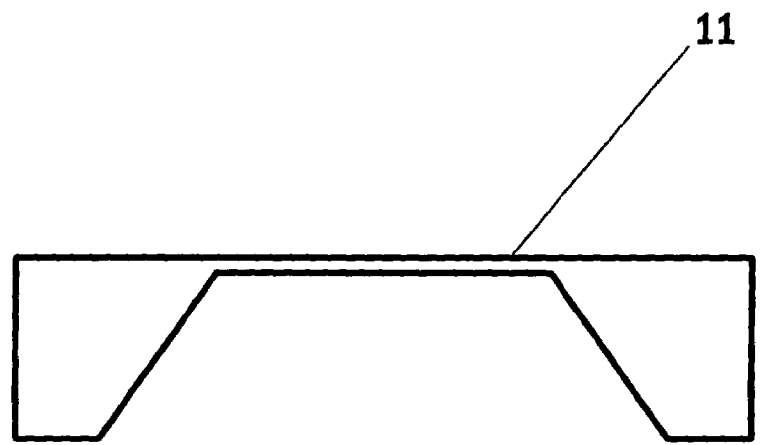
FIG. 3 shows the membrane structure of a pressure sensor obtained by anisotropic wet, etching according to prior art.
Figure 4:
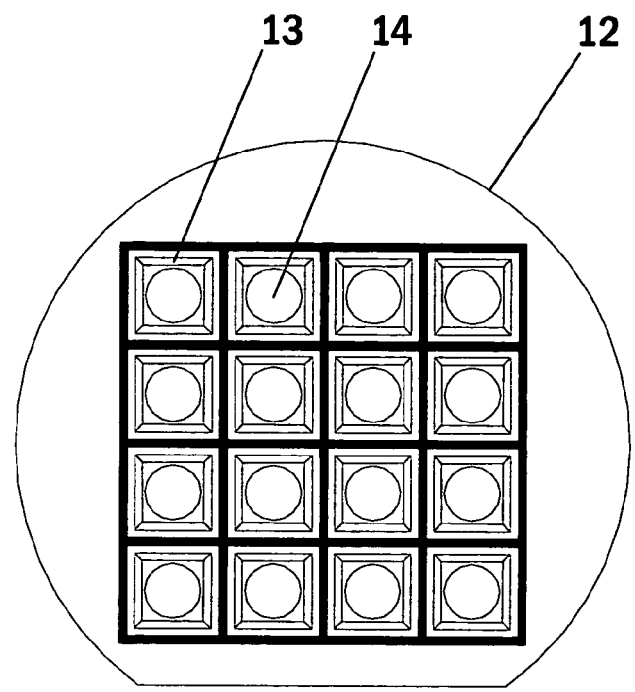
FIG. 4 shows a silicon wafer of type (100) according to prior art, in which membrane structures of a pressure sensor have been manufactures by anisotropic wet etching.
Figure 5:
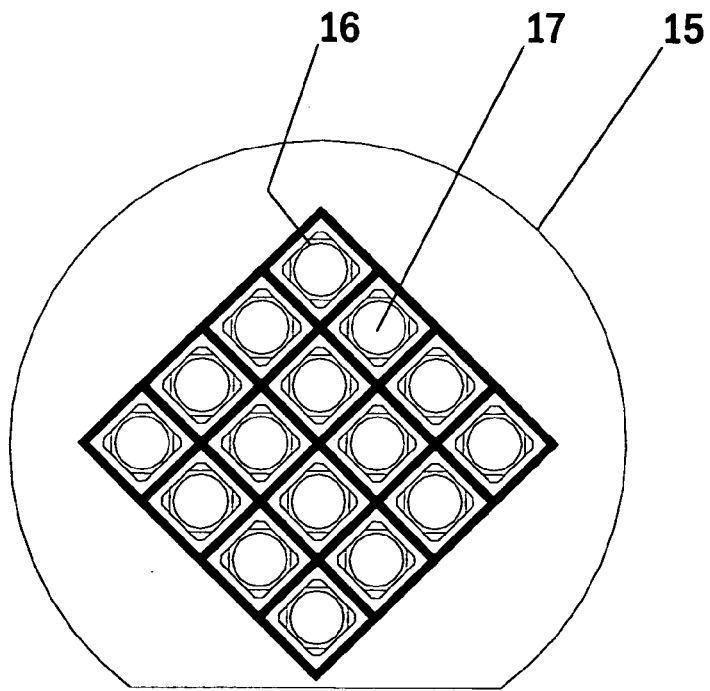
FIG. 5 shows a silicon wafer of type (100) according to the present invention, into which pressure sensor membrane structures have been manufactured by anisotropic wet etching.

FIG. 5 shows a silicon wafer of type (100) according to the present invention, in which wafer pressure sensor membrane structures have been produced by anisotropic wet etching. Sixteen diamond shaped etched areas are depicted in the silicon wafer 15 according to the present invention. In the figure, circles indicate the area 17 of the flexible membrane portion of the pressure sensor, which area is patterned on the back surface of the membrane. The cutting lines for the pressure sensor elements are drawn with heavy black lines. In the solution according to the present invention, the orientation of the cutting is turned by 45 degrees in relation to the direction <110>.

In the silicon wafer of direction (100), according to the present invention, diamond shaped membrane areas 17 are produced by wet etching, in which areas the crystal planes {111} will be located at the corners of the wet etched membrane well. By means of the present invention, a large portion of the surface area loss, caused by the sloping planes, is regained in the dimensions of the sensor.

Figure 6:
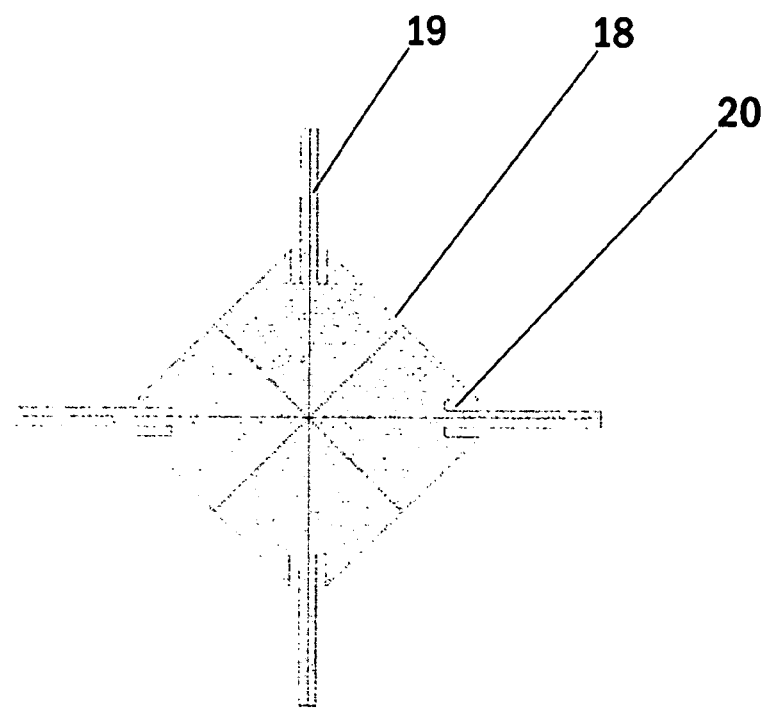
FIG. 6 shows an etching mask according to the present invention provided with corner compensations.

FIG. 6 shows an etching mask enabling the structure according to the invention. In the etching mask 18, there is a diamond shaped opening, and it can also comprise slots 19 defining the locations of the planes {111} in the corners of the membrane, and also structures 20 delaying the etching underneath the mask. The etching mask 18 is attached on top of the essentially diamond shaped pressure sensor structures to be etched on a silicon wafer oriented in the direction (100) such, that the ends of the slots 19 in the etching mask 18 are located at the corners of the pressure sensor structures to be etched.

As an etching solution, an alkali etching silicon anisotropically can be used, for example a solution of potassium hydroxide (KOH), a solution of ethylene diamine pyrocathechin (EDP), a solution of sodium hydroxide (NaOH) or a solution of tetramethylammonium hydroxide (TMAH).

Figure 7:
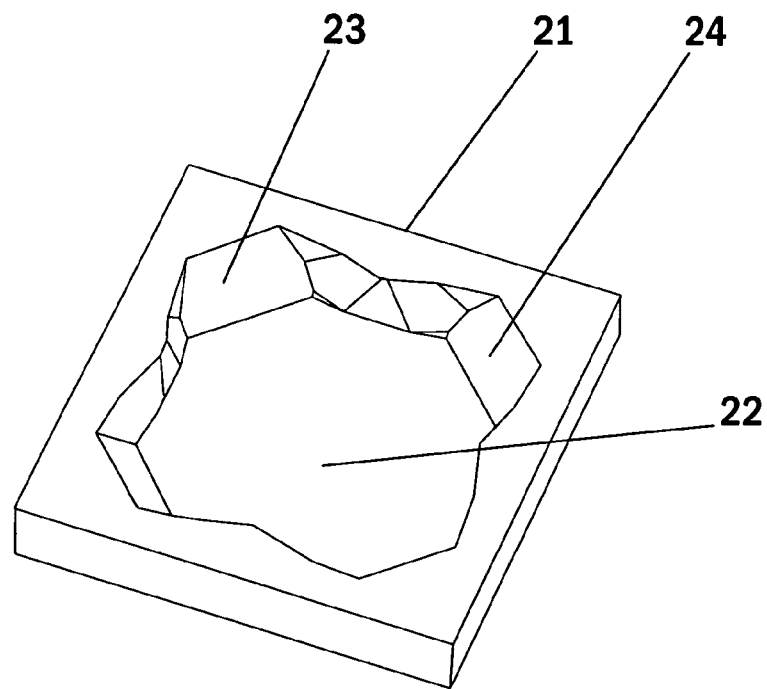
FIG. 7 shows an etched pressure sensor structure according to the present invention manufactured using an etching mask with corner compensations.

FIG. 7 shows an etched pressure sensor structure according to the present invention manufactured using the etching mask 18 having corner compensations. The mask pattern will be etched underneath the mask in etching according to the invention, but at the edges of the pressure sensor structure 21, there will still remain steep walled crystal planes {010}. A larger membrane portion surface area 22 is obtained with the etched pressure sensor structure 21 manufactured using the etching mask 18 according to the present invention. The silicon crystal planes {111} will be located at the corners 23, 24 of the wet etched membrane well in the etched pressure sensor structure 21 manufactured using the etching mask of the present invention. Following etching, the etching mask 18 is removed.

The pressure-sensitive membrane areas can be shaped on the opposite side of the etched wafer. Having membranes of circular shape, the planes <111> remaining in the corners of the pressure sensor structure 21 do not define the shape of the flexible membrane. Furthermore, gas pockets for improving the long term stability of the reference pressure can be etched in the corners of the pressure sensor. After the manufacturing of the pressure sensor membrane, the pressure sensor structure 21 is attached to a support structure and is sawn into separate pressure sensor elements.

No compensation residue, which might change the shape of the bending of the membrane, will remain on the surface of the etched pressure sensor structure 21 manufactured using the etching mask of the present invention. Thus, a desired shape of the flexible membrane is achieved with the pressure sensor structure 21 of the present invention, which shape is proportional to the calculated response of the capacitance-pressure-curve.

In manufacturing the pressure sensor structure of the present invention, an area of, for example, circular shape defining the flexible membrane is patterned on the back side of the pressure sensor membrane or in the support structure facing the membrane.

The invention claimed is:

1. A method of manufacturing a capacitive pressure sensor out of a silicon wafer element, in which method
the silicon wafer is masked for wet etching,
the silicon wafer is etched,
the etching mask is removed from the silicon wafer
the silicon wafer is attached to a support structure, and
the silicon wafer is cut into separate pressure sensor elements,
wherein the etching mask (18) is attached over pressure sensor structures, essentially diamond shaped in relation to the direction <110>, to be anisotropically wet etched into a silicon wafer, which is oriented in the direction (100), such that the ends of slots (19) in the etching mask (18) coincide with the corners of the pressure sensor structures to be etched.

2. Method of claim 1, wherein the etching mask (18) may comprise slots (19) oriented in the direction <110>.

3. Method of claim 1, wherein the etching mask (18) may comprise structures (20) for delaying etching underneath the mask.

4. Method of claim 1, wherein pressure sensitive membrane areas are shaped on the opposite side of the etched wafer or in the support structure facing the membrane.

5. Method of claim 4, wherein the shape of the membrane areas shaped on the opposite side of the etched wafer has essentially rounded corners.

6. Method of claim 4, wherein the shape of the membrane areas shaped on the opposite side of the etched wafer has essentially rounded corners and the membrane is supported at its center.

7. Method of claim 4, wherein the membrane areas are shaped by removing material by, for example, etching or oxidizing.

8. Method of claim 1, wherein the etching solution to be used is an anisoptropic alkali, for example a solution of potassium hydroxide (KOH), a solution of ethylene diamine pyrocathechin (EDP), a solution of sodium hydroxide (NaOH) or a solution of tetramethylammonium hydroxide (TMAH).

9. A capacitive pressure sensor, wherein the silicon crystal planes {111} are located at the corners of the wet etched membrane well of the pressure sensor element.

10. Pressure sensor according to claim 9, wherein pressure sensitive membrane areas are shaped on the opposite side of the etched wafer or in the support structure facing the membrane.

11. Pressure sensor according to claim 10, wherein the shape of the pressure sensitive membrane areas shaped on the opposite side of the etched wafer has essentially rounded corners.

12. Pressure sensor according to claim 9, wherein the membrane is supported at its center.

* * * * *